US006972889B2

(12) United States Patent
Goodwin-Johansson et al.

(10) Patent No.: US 6,972,889 B2
(45) Date of Patent: Dec. 6, 2005

(54) MEMS ELECTROSTATICALLY ACTUATED OPTICAL DISPLAY DEVICE AND ASSOCIATED ARRAYS

(75) Inventors: Scott H. Goodwin-Johansson, Pittsboro, NC (US); Brian H. Augustine, Bridgewater, VA (US); Lindsey N. Yadon, Raleigh, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 673 days.

(21) Appl. No.: 10/184,345

(22) Filed: Jun. 27, 2002

(65) Prior Publication Data

US 2004/0001033 A1    Jan. 1, 2004

(51) Int. Cl.[7] .............................................. G02B 26/02
(52) U.S. Cl. ...................................... 359/290; 359/230
(58) Field of Search ................................ 359/290, 241, 359/230, 231, 254, 224, 227; 345/31, 32, 345/48, 108

(56) References Cited

U.S. PATENT DOCUMENTS

| | | | |
|---|---|---|---|
| 3,772,537 A | 11/1973 | Clifford et al. | |
| 3,989,357 A | 11/1976 | Kalt | |
| 4,094,590 A | 6/1978 | Kalt | |
| 4,266,339 A | 5/1981 | Kalt | |
| 4,695,837 A | 9/1987 | Kalt | |
| 4,736,202 A | 4/1988 | Simpson et al. | |
| 4,747,670 A | 5/1988 | Devio et al. | |
| 4,786,898 A | 11/1988 | Hata et al. | |
| 4,807,967 A | 2/1989 | Veenvliet et al. | |
| 4,831,371 A | 5/1989 | Hata | |
| 4,891,635 A | 1/1990 | Hata | |
| 5,233,459 A | 8/1993 | Bozler et al. | |
| 5,552,925 A * | 9/1996 | Worley | 359/230 |
| 5,638,084 A | 6/1997 | Kalt | |
| 6,067,183 A | 5/2000 | Furlani et al. | |
| 6,127,908 A | 10/2000 | Bozler et al. | |
| 6,223,088 B1 | 4/2001 | Scharnberg et al. | |
| 6,229,683 B1 | 5/2001 | Goodwin-Johansson | |
| 6,229,684 B1 | 5/2001 | Cowen et al. | |
| 6,236,491 B1 | 5/2001 | Goodwin-Johansson | |

OTHER PUBLICATIONS

M. Elwenspoek, L. Smith, B. Hök;*Active Joints for Microrobot Limbs; I Miemmech Microeng 2;* 1992; pp. 221-223; IOP Publishing, Ltd.

Rob Legtenberg, Erwin Berenschot, Miko Elwenspoek, Jan Fluitman; *Electrostatic Curved Electrode Actuators; Proceedings IEEE Micro Electro Mechanical Systems;* 1995; pp. 37- 42; IEEE Catalog No. 95CH35754.

(Continued)

*Primary Examiner*—Scott J. Sugarman
*Assistant Examiner*—Richard Hanig
(74) *Attorney, Agent, or Firm*—Oblon, Spivak, McClelland, Maier & Neustadt, P.C.

(57) ABSTRACT

A simplified MEMS optical display device driven by electrostatic forces and associated arrays are provided for. The optical display device includes an optically transparent substrate, an optically transparent fixed electrode disposed on the substrate and a pigmented translucent film disposed on the substrate. A moveable optical shutter is affixed to the substrate and is generally aligned with the fixed electrode and the pigmented translucent film. The moveable optical shutter comprises an electrode element and a biasing element. In addition, a fixed portion attached to the substrate and a distal portion adjacent to the fixed portion defines the optical shutter. When an electrostatic voltage differential is established between the fixed electrode and the optical shutter electrode element the distal portion of the optical shutter will move to controllably regulate the pigmentation of an optical signal.

36 Claims, 8 Drawing Sheets

OTHER PUBLICATIONS

M. Elwenspoek, M. Weustink, R. Legtenberg; *Static and Dynamic Properties of Active Joints;Transducers '95 Eurosensors IX;* 1995; pp. 412-415; The 8th International Conference on Solid-State Sensors and Actuators and Eurosensors, Stockholm, Sweden, Jun. 25-29, 1995.

J. Haji-Babaer, C.Y. Kwok, R.S. Huang; *Integrable Active Microvalve with Surface Micromachined Curled-Up Actuator; Transducers '97;* 1997; pp. 833-836; IEEE; 1997 International Conference on Solid-State Sensors and Actuators, Chicago, Jun. 6-19, 1997.

\* cited by examiner

MEMS ELECTROSTATICALLY ACTUATED OPTICAL DISPLAY DEVICE AND ASSOCIATED ARRAYS

FIELD OF THE INVENTION

The present invention relates to an optical display device, and more particularly to a microelectromechanical system (MEMS) electrostatically actuated optical display device and associated arrays that are capable of providing both transmissive and reflective display of optical signals.

BACKGROUND OF THE INVENTION

Optical display devices are typically classified as reflective, emissive or transmissive. Liquid crystal displays used in portable computers and other electronic devices, such as paging devices, telephones, facsimile machines, watches, instruments and the like, are examples of low-power, reflective optical displays. These devices can be seen clearly in bright lighting conditions and depend upon reflection of ambient light, off a high contrast display surface, for their appearance. The most significant drawback related to reflective displays is that they become difficult, or some instances impossible, to view clearly in dim or low lighting conditions.

Emissive displays include a light-emitting source, for example electroluminescent phosphors or diodes, which emit light when stimulated. Emissive devices include CRTs, electroluminescent displays, vacuum fluorescent displays, field-emissive displays, and OLEDs (organic LEDs). Typically, emissive displays are implemented in conventional television screens and computer monitors as well as, for example, portable computer displays that employ light-emitting diodes. Another important application for light-emitting, emissive displays is in instrumentation for aircraft, automobiles and other vehicles. Light-emitting displays can be clearly seen in low lighting conditions but lose contrast and visibility in bright light, for example, when taken outdoors. Safety problems may occur when operators view vehicle instruments or other travel guidance displays, during dramatic changes in ambient light.

Transmissive displays create an image by modulating, at the pixel level, a light source behind the display. Unlike emissive displays in which the amount of light generated is solely a factor of the intensity of the light source, the amount of light generated by the transmissive display is controlled through modulation, such as by optical shutters and the like. A Liquid Crystal Display (LCD) is the most common example of a transmissive display.

Prior art electrostatically-actuated optical displays have been formed that utilize metallized polymer films as one electrode and a second rigid or fixed electrode. In application, when voltage is applied between the two electrodes the metallized polymer electrode deflects and is attracted toward the fixed electrode. In most embodiments, the metallized polymer film is typically a rolled up (fully curled) structure prior to application of the voltage and uncurls upon application of the requisite voltage. For examples of electrostatically actuated optical displays see, U.S. Pat. No. 5,233,457, entitled "Electric Display Device", issued on Aug. 3, 1993, in the name of inventors Bozler et al., and U.S. Pat. No. 5,519,565, entitled "Electromagnetic-Wave Modulating, Movable Electrode, Capacitor Elements", issued May 21, 1996, in the name of inventors Kalt et al.

The Bozler '459 patent describes an optical display that operates in a reflective mode. The desired color is integrated into the moveable optical shutter and when electrostatic voltage is applied to the shutter, the shutter deflects (i.e., unrolls) and light that is incident on the deflected shutter provides for a reflected optical signal of the desired color. Additionally, the Bozler '459 patent teaches multiple moveable optical shutters, each shutter incorporating a desired color, such that the desired color within the spectrum of colors will be reflected when electrostatic voltage is applied to a combination of the moveable optical shutters. The Kalt '565 patent teaches a similar reflective mode device in which a reflective colored material is included in the moveable optical shutters. Additionally, the Kalt '565 teachings provide for multiple moveable optical shutters to be positioned on both the front side and backside of the supporting substrate.

Typically, these prior art reflective-mode optical displays will employ display shutters (i.e., moveable electrode films) that have polymer films ranging from 1–4 micrometers in thickness and metal films ranging from 300 to 1000 angstroms in thickness. Additionally, the plan view (i.e., unrolled) dimension of the width and/or length of the optical shutter is typically greater than 2 millimeters. The overall thickness of the shutter and the plan view area of the shutter can limit the capability of these prior art shutters to either fully roll-up or to provide for a tightly rolled-up shutter. If the shutters are not provided so that they have minimal roll diameter, configuring an array consisting of multiple optical displays becomes problematic. This is because a greater percentage of the optical signal is blocked or reflected by the optical shutter in the non-actuated state in which transmission of the signal through the optical display is desired.

Thus, there is a strong need to develop an optical display that can operate in both a reflective mode and a transmissive mode. Such an optical display would be lighting-independent, allowing the user to view the display in both light and dark environments. For example, such a dual mode display would be highly beneficial in an aviation application; allowing the aircraft flight information displays to remain clearly visible as an aircraft emerges from heavy cloud into the brilliant sunlight of the stratosphere. Additionally, portable computing devices, such as laptop computers, personal data assistants (PDAs) and the like, would benefit from being able to be sufficiently illuminated outdoors, as well as, indoors.

Additional desirable attributes of the dual mode optical display include thin flexible optical shutters that allow for minimal curl diameter. Such shutters allow the highest degree of light to be transmitted when the display is operating in a transmissive mode. The thinner flexible optical shutters also result is less power being required to actuate the optical shutter.

SUMMARY OF THE INVENTION

The present invention provides for an optical display device and associated optical display arrays driven by electrostatic force. The device is capable of reflective or transmissive mode operation and benefits from a wide viewing angle and improved illumination intensity. In addition, the device and array herein described provide for ease in fabrication, low power consumption and minimal cost per unit. Further, methods are provided for using the optical display device and array to effectuate dual transmissive and reflective mode optical signal transmission.

In one embodiment of the invention, the optical display device driven by electrostatic forces comprises an optically transparent substrate, an optically transparent fixed electrode disposed on the substrate and a pigmented translucent film disposed on the substrate. Affixed to the substrate construct is a moveable opaque optical shutter that is generally aligned with the fixed electrode and the pigmented translucent film. The moveable opaque optical shutter comprises an electrode element and a biasing element and is also defined by a fixed portion attached to the substrate and a distal portion adjacent to the fixed portion that is moveable with respect to the fixed electrode. Additionally, a dielectric element will be disposed between the fixed electrode and the optical shutter electrode element.

In operation a voltage differential is established between the fixed electrode and the optical shutter electrode element to thereby move the optical shutter relative to the fixed electrode. By moving (i.e. uncurling) the distal portion of the optical shutter, it is possible to thereby controllably regulate the pigmentation of an optical signal.

In the biased state (i.e., no voltage applied) the moveable optical shutter remains in a generally curled position. In this non-actuated state the optical device operates in a transmissive mode allowing an optical signal to propagate through the optically transparent substrate, the optically transparent fixed electrode and the pigmented translucent film. Upon application of voltage, an electrostatic force is created between the fixed electrode and the electrode element on the optical shutter. The electrostatic force serves to uncurl the optical shutter such that the shutter lies in plane generally parallel to a planar surface of the substrate. In this actuated state the optical device operates in a reflective mode allowing an optical signal to propagate through the optically transparent substrate, the optically transparent fixed electrode and the pigmented translucent film. The optical signal is then reflected by the opaque optical shutter and re-propagated through the pigmented translucent film, the optically transparent substrate and the pigmented translucent film.

In a typical embodiment of the invention the optically transparent substrate will further comprises glass and the optically transparent fixed electrode further comprises an indium tin oxide material. The pigmented translucent film will typically further comprise a primary color film, for example, a red, green or blue film, such that combining the films in an array structure allows for the entire spectrum of colors to be generated.

The electrode element in the optical shutter will typically comprise a layer of conductive material, typically a metal, such as gold or the like. The biasing element in the optical shutter will typically comprise at least one polymer film layer. In one embodiment of the invention, a biasing element layer is formed on either side of the electrode element. In an alternate embodiment, the electrode element layer is disposed between two separate biasing element layers, in a sandwich-like construct. The thickness of the layers used to form the elements, the materials chosen to form the elements and the processing involved in forming the elements will dictate the amount of resulting bias (i.e. curl) that is formed in the optical shutter. In most embodiments, the distal portion of the moveable optical shutter will be biased so as to curl away from the substrate when no electrostatic force is created between the optical shutter electrode element and the fixed electrode.

In an additional embodiment of the invention, the optical display device will further comprise a supporting enclosure that supports the optical display device and provides for the optical shutter to be enclosed. In most instances, the enclosure will house an illumination source for transmissive mode operation. The interior surfaces of the supporting enclosure will typically be light absorbing interior surfaces capable of absorbing light in a reflective mode of operation. In an additional embodiment, the interior surfaces of the supporting enclosure include at least one interior surface electrode disposed thereon and at least one moveable light-absorbing film generally overlying the interior surface electrode. The light absorbing film provides for light absorption when the shutter(s) is in a closed state (i.e. uncurled) and reflection of internal illumination when the shutter(s) is in the open state (i.e. curled).

In yet another embodiment of the invention, the optical display device is implemented in an array configuration. The array comprises an optically transparent substrate, an optically transparent fixed electrode disposed on the substrate and a plurality of pigmented translucent films disposed on the substrate. Associated with each of the plurality of pigmented translucent films is a moveable optical shutter that generally overlies the fixed electrode and the associated pigmented translucent film. Each optical shutter is formed in the same fashion as described above. The optical shutters may be arranged in standard X-Y (row and column) configuration so as to facilitate an X-Y addressing scheme. Other array formations may also be implemented. The plurality of pigmented translucent films will generally comprise the primary colors of red, green and blue pigmented films arranged so as to provide for the generation of all colors within the spectrum. The array will typically be implemented within a supporting enclosure and the enclosure will house one or more illumination sources.

In a transmissive mode, the optical display device of the present invention is illuminated internally. The internal illumination travels past an open state shutter and through the pigmented translucent film. Thereby, illuminating the display in accordance with the pigment of the film. In the closed state shutter the light emanating from the illumination source would be blocked or reflected back into the enclosed area. In which case, the optical display device will appear as black. The amount that the shutter is open can be made to depend on the applied voltage due to variations in the plan view area (i.e. shape) of the fixed electrodes. In this manner, the intensity of color at each pixel can be controlled.

In a reflective mode, the optical display device of the present invention is illuminated externally. In the open shutter state, the external light strikes the top of the substrate construct, travels through the pigmented translucent film and into the enclosed area where it is absorbed by the interior surfaces of the enclosure. In this, instance the optical display device will appear as black. In the closed shutter state, the external light strikes the top of the substrate construct, travels through the pigmented translucent film and is reflected by the optical shutter. The light reflects back through the substrate into the pigmented translucent film, thereby, illuminating the display in the pigment of the film.

As such the optical display device of the present invention is capable of reflective and/or transmissive mode display operation with minimal power required to activate the optical shutter. The fixed electrode in the substrate and the electrode element in the optical shutter are separated by a small gap that makes it possible to apply minimal electrostatic voltage across the electrodes to cause the membranes to uncurl into a closed shutter state. Additionally, the simplistic design of the optical shutter makes for a device that can be manufactured efficiently and at a minimal cost.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
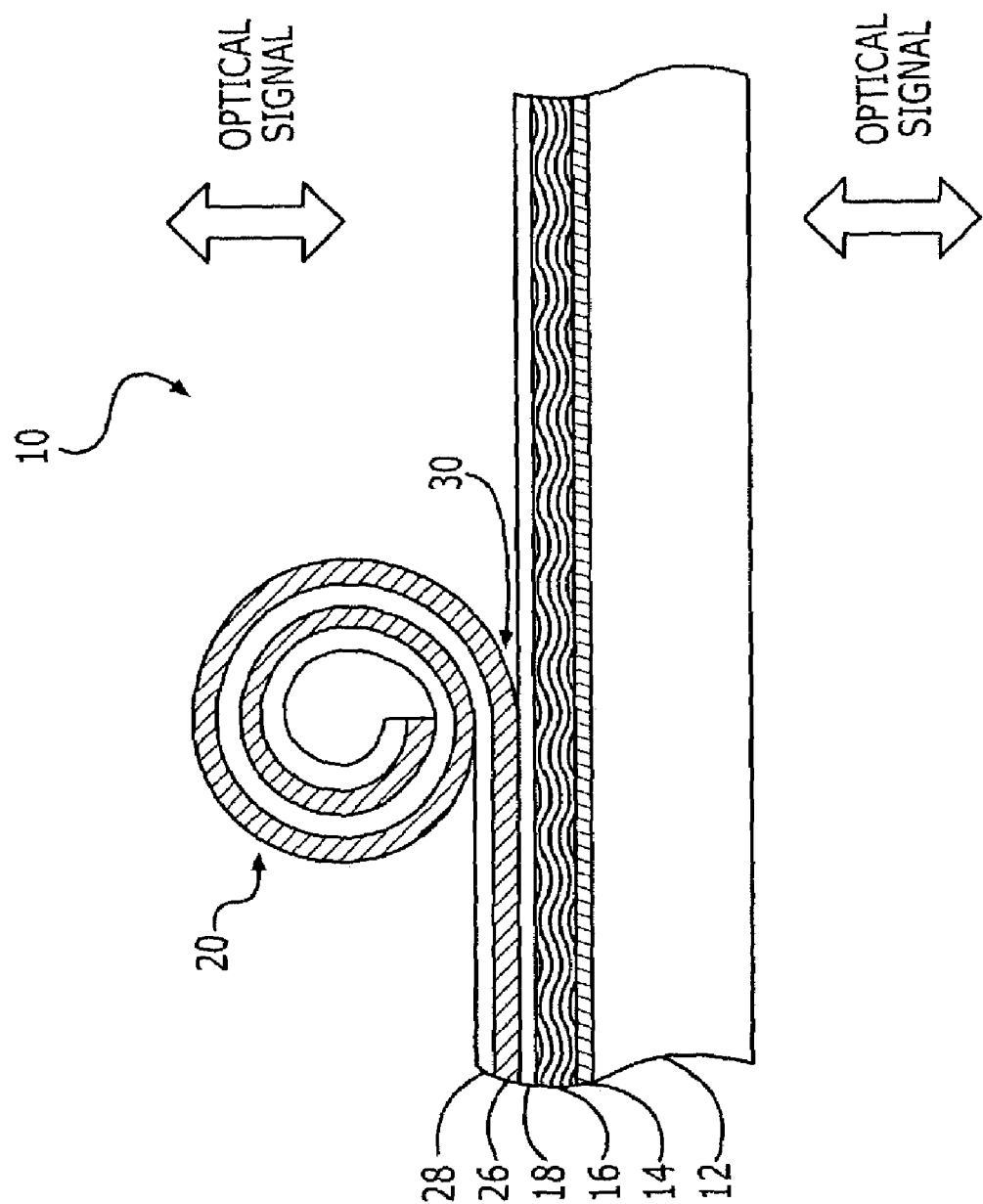
FIG. 1 is a cross-sectional view of an optical display device in a curled, open state, in accordance with an embodiment of the present invention.
Figure 2:
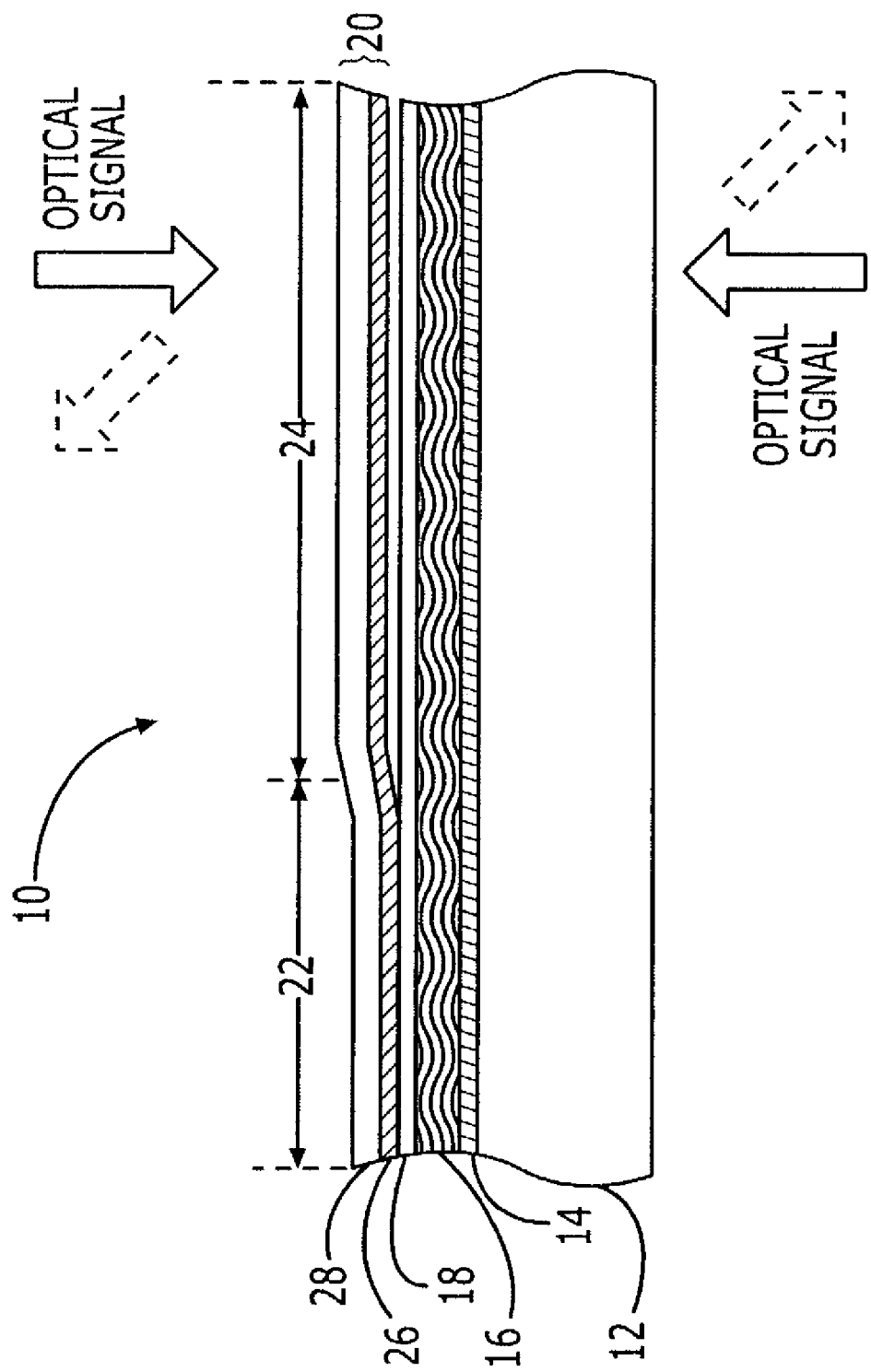
FIG. 2 is a cross-sectional view of an optical display device in an uncurled, closed state, in accordance with an embodiment of the present invention.

Referring to FIGS. 1 and 2, shown are cross-sectional view diagrams of the simplified structure of an optical display device, in accordance with an embodiment of the present invention. The optical display device 10 of the present invention can be used in a reflective mode or a transmissive mode, depending on the application, to allow visible communication of an optical signal. The optical display device can be embodied in a large-scale optical display array device, as will be disclosed at length herein. The optical display device of the present invention provides for a wide viewing angle and a high degree of optical intensity. In addition, the device can be operated rapidly and with minimal power.

In a first embodiment as shown in FIG. 1, the optical display device comprises in layers, an optically transparent substrate 12, an optically transparent fixed electrode 14, an optically translucent pigment film 16, a dielectric element 18, and a moveable optical shutter 20. The moveable optical shutter is a flexible, opaque, composite that is aligned with and overlies the substrate, the fixed electrode and the pigmented film. Along its length, the moveable optical shutter has a fixed portion 22 (denoted in FIG. 2) and a distal portion 24 (denoted in FIG. 2). The fixed portion is substantially affixed to the underlying substrate or intermediate layers. The distal portion extends from the fixed portion and is released from the underlying substrate during the fabrication process. In the FIG. 1 embodiment, the distal portion is generally equivalent to the curled-up portion of the moveable optical shutter and the fixed portion is generally equivalent to the uncurled portion of the moveable optical shutter.

The moveable optical shutter 20 comprises multiple layers including at least one electrode element 26 and at least one biasing element 28. The number of layers, thickness of layers, arrangement of layers, and choice of materials used in the optical shutter may be selected to cause the shutter to curl away from the underlying substrate, as shown in FIG. 1. Thus, by varying the parameters described above the distal portion can be controllably biased to curl as it extends away from the fixed portion. In the curled state (as depicted in FIG. 1), the shutter is said to in an open or transmissive state, which allows an optical signal emanating from either above or below the substrate to pass through the substrate. In most embodiments it will be desirable to bias the optical shutter such that the diameter of the shutter in the curled position is kept to a minimum. If the curl of the shutter is kept tight (i.e., minimal diameter) in the transmissive state, it allows for the maximum degree of optical signal transmission because the curled shutter is blocking or reflecting less of the signal.

In operation, voltage is applied across the transparent fixed electrode 16 and/or the electrode element 26 in the optical shutter 20 to create an electrostatic force that attracts the moveable optical shutter toward the fixed electrode. A source of electrostatic energy (not shown in FIGS. 1 and 2) will be electrically connected to the fixed electrode and/or the electrode element of the optical shutter. The attractive electrostatic force generated by the application of voltage causes the moveable optical shutter to unroll and, thus, alters the separation between the moveable optical shutter and the underlying substrate. In the uncurled state (as depicted in FIG. 2), the shutter is said to be in a closed or reflective state, i.e., the shutter reflects an optical signal emanating from either above or below the optical shutter. When the voltage is released the intrinsic stress in the moveable optical shutter curls the shutter in the direction that the membrane is biased, in this instance, away from the substrate and the shutter resembles the open state shown in FIG. 1. Relatively small voltages are required to fully attract the moveable optical shutter to the substrate because the generally tangential gap 30 at the onset of the distal portion 24 provides minimal distance between the electrode element 26 in the moveable optical shutter and the fixed electrode 14.

The optically transparent substrate 12 will typically comprise glass, although other transparent substrates such as polymeric materials can also be implemented. The transparent substrate will typically have a thickness ranging from about 0.40 millimeters (mm) to about 2.0 mm, preferably about 1.0 mm.

The optically transparent fixed electrode 14 will typically comprise Indium Tin Oxide (ITO). ITO is typically used because of its high transparency throughout the visible spectrum and superior conductivity. However, other transparent conductors, such as Group III nitrides and the like, may also be used for the optically transparent fixed electrode and are within the inventive concepts herein provided for. In the instance where ITO is used as the optically transparent fixed electrode it will typically have a thickness ranging from about 200 angstroms about 3500 angstroms, preferably about 1000 angstroms. It should be noted that the optically transparent fixed electrode is not limited in quantity and or plan view shape. Thus, it is possible to construct the optical display with a plurality of segmented fixed electrodes and/or fixed electrode(s) of any predetermined shape. The quantity/segmentation of electrodes and the shape of the electrodes will be dictated by the requirements of the display. Hence, it is possible to construct the optical display with fixed electrodes having generally rectangular, triangular or any other plan view shape and it is possible to segment the fixed electrode so that each fixed electrode is individually addressable.

Figure 3:
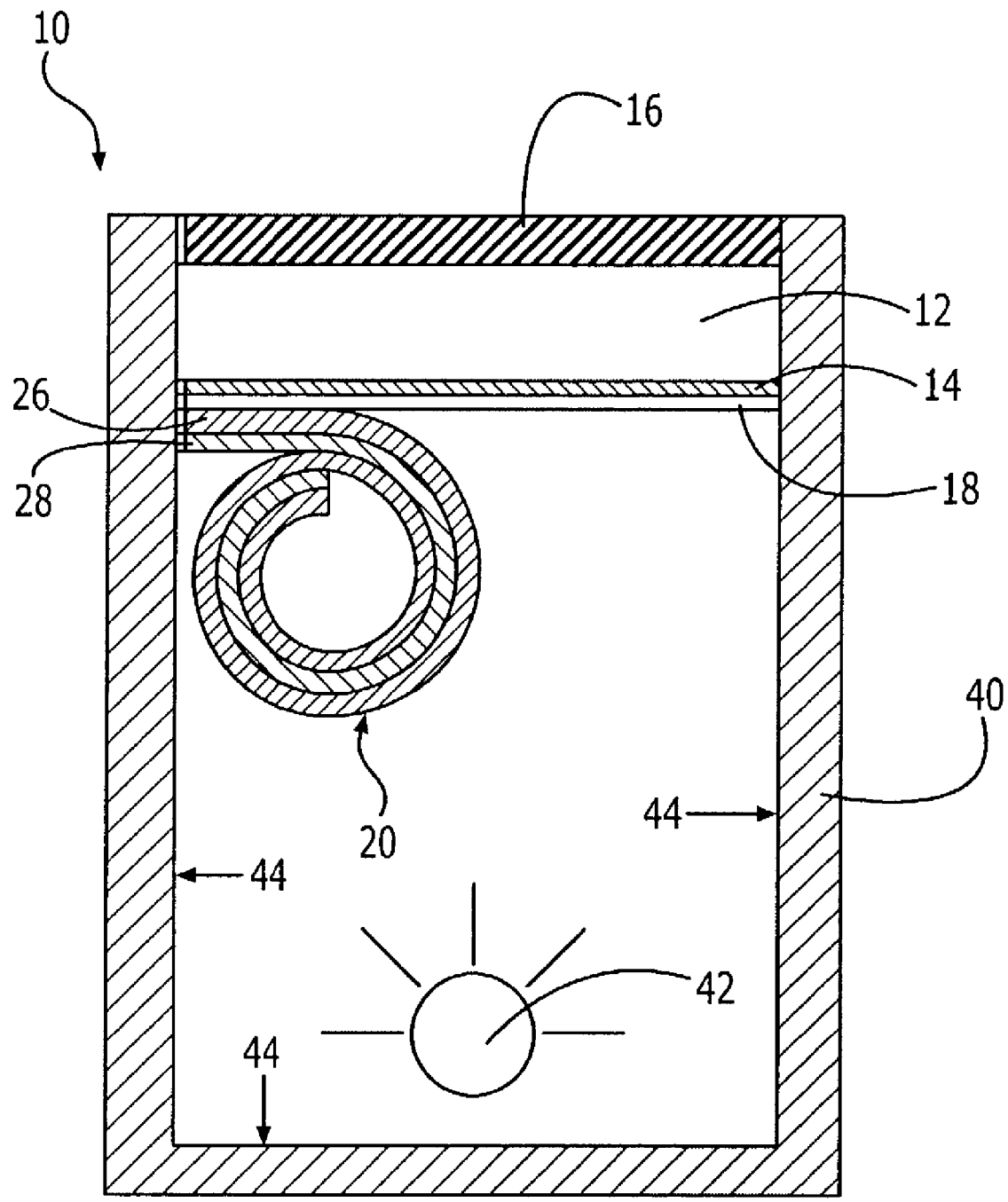
FIG. 3 is a cross-sectional view of an optical display device incorporating a supporting enclosure and illumination source, in accordance with an embodiment of the present invention.
Figure 4:
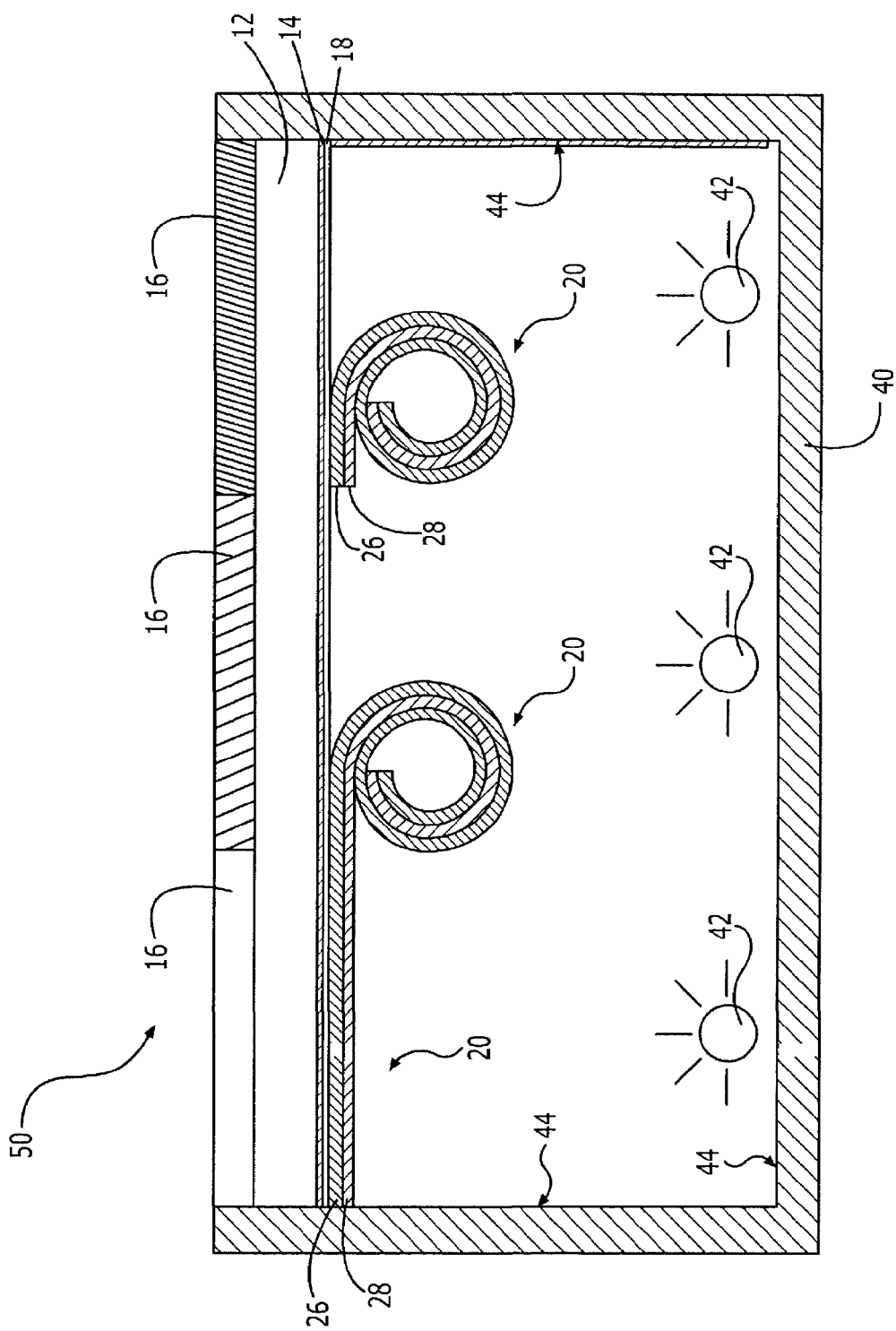
FIG. 4 is a cross-sectional view of an optical display device incorporating multiple optical shutters and associated pigmented translucent films, in accordance with an embodiment of the present invention.

The pigmented translucent film 16 will typically comprise an organic or inorganic material, such as a polymeric film or the like. The translucent film will correspond in pigment to the desired color that is to be displayed. In typical optical display array devices (as shown in FIG. 4) a plurality of pigmented translucent films will be incorporated, typically having a pigmented translucent film corresponding to each of the three primary colors (red, blue and green) that are used for comprehensive color generation. As is known by those skilled in the optical arts, other combinations of pigmented translucent films can be implemented in arrays to create the full spectrum of visible colors. The pigmented translucent film will typically range in thickness from about 1 micrometer to about 10 micrometers, preferably about 5 micrometers. As shown in FIGS. 1 and 2, the translucent pigmented film may be disposed on the substrate 12 between the fixed electrode 14 and the dielectric element 18. Additionally, the translucent film may be disposed on the opposite side of the substrate, such that the translucent pigmented film is the first layer/element in the optical display device construct (as shown in FIGS. 3 and 4). It is also possible to dispose the translucent pigmented film between the substrate and the fixed electrode. Positioning of the translucent pigment film on the same side of the substrate as the optical shutter is typically dictated by parallax related issues caused by the thickness of the transparent substrate compared to the size of the shutter. Thus, in most instances, to assure that the optical shutters are properly aligned with a corresponding translucent pigmented film the film(s) are disposed on the same side of the substrate as the optical shutter.

The dielectric element 18, as shown in FIGS. 1 and 2, will typically comprise polyimide, a suitable oxide, or any other dielectric material having adequate insulating capability and release layer processing tolerance. The dielectric layer is implemented to prevent the fixed electrode from electrically shorting the electrode element in the optical shutter. The dielectric element should be formed of a generally thin layer of material to maximize electrostatic force but should be thick enough that it does not break down electrically. In some applications it may be possible to fabricate the optical device without incorporating a distinct dielectric layer on the substrate construct. For example, as shown in FIG. 1, in which the pigmented translucent film is adjacent to the dielectric layer, it may be possible to implement a pigmented translucent film having appropriate dielectric characteristics that would insure adequate insulation between the electrodes. Additionally, it may be possible to incorporate the dielectric element within the optical shutter by layering the optical shutter such that a biasing/dielectric layer is disposed between the electrode element of the optical shutter and the substrate. It should be noted that in configurations that incorporate the dielectric element in the optical shutter the dielectric element is not required to be transparent.

It may also be possible, and is within the inventive concepts herein disclosed, to have the dielectric element comprise the air gap that exists between the fixed electrode and the electrode element of the shutter or any other material that physically separates the electrodes and provides adequate dielectric capabilities. In those applications in which the air gap comprises the dielectric element it is advisable to provide a means for standoff between the electrode element(s) in the substrate and the shutter. For example, a textured surface, in the form of dimples or the like, on the electrode layers 14 and/or 26 and/or the pigmented translucent film 16 may serve as the necessary standoff to allow for the air gap to act as the requisite dielectric element.

The dielectric element 18 may be formed with a generally planar surface (as shown in FIG. 1) or the dielectric element may be formed with a textured surface. A textured surface may be preferred in those embodiments in which the moveable optical shutter "sticks" to the underlying substrate during device operation. This phenomenon is commonly referred to in the MEMS field, as "stiction". By providing for a textured surface at the optical shutter-to-substrate interface less surface area is contacting the moveable optical shutter when the shutter reaches a "down" or closed state position and thus less force is necessary to overcome the "stiction". Overcoming "stiction" allows the optical display device to perform with greater reliability and improved cycle time. Textured surfaces are typically formed during fabrication and the implementation and fabrication of such surfaces is well known in the art. In embodiments that do not incorporate the dielectric element as the interface layer between the substrate construct and the optical shutter it may be possible to provide for a textured surface on any other element of the substrate construct that will routinely contact the optical shutter during operation of the device. Additionally, it may be possible to employ a textured surface on the surface of the optical shutter that routinely contacts the substrate construct.

The layers of the optical shutter 20 generally overlie the fixed electrode 14. Preferably, the electrode element of the optical shutter will comprise one or more layers and the biasing element will comprise one or more layers. As shown in FIG. 1, in one embodiment of the invention the optical shutter comprises an electrode element 26 formed as a single layer. A biasing element 28, formed as a single layer, is disposed on the electrode element. It is also possible to configure the optical shutter with the biasing element, in the form of a layer, disposed on the opposite side of the electrode element (i.e. adjacent to the substrate construct). In such a configuration and as previously discussed above, the biasing element may also serve as an insulator that allows for the complete electrical isolation between the fixed electrode and the electrode element of the optical shutter. It is also possible to construct the optical shutter such that the electrode element, formed of one or more layers, is disposed between the biasing element (i.e. a separate layer(s) of biasing disposed on both sides of the electrode element). In such an embodiment the layer of biasing nearer the substrate is typically thinner than the layer of biasing furthest from the substrate so as to maximize the bias in the optical shutter and create minimal curl diameter when the shutter is in the opened state.

The elements comprising the optical shutter are formed from flexible materials, for instance, flexible polymers may be used to form the biasing element 28 and flexible conductors may be to form the electrode element 26. One or more of the elements comprising the optical shutter will be opaque, such that an optical signal will be reflected upon contact when the optical shutter is activated to the closed or reflective state (FIG. 2). In one embodiment the biasing element will comprise a polyimide material, however, other suitable flexible polymers capable of withstanding the release layer etch process can also be employed. The electrode element preferably comprises gold, although other flexible conductors tolerant of release layer processing, such as conductive polymer films, may also be used. If gold is used to form the electrode element, a thin layer of chromium (not shown in FIG. 1) may be deposited prior to depositing the gold layer and/or following the gold layer to allow improved adhesion of the gold layer to the adjacent biasing element. As previously discussed, the number of layers, thickness of layers, arrangement of layers, and choice of materials used in the optical shutter 18 will be selected to bias the moveable composite as required. A typical shutter comprising an electrode layer with adjacent biasing layers on each side of the electrode with have a thickness of about 1.0 micrometers to about 2.0 micrometers, preferably 1.5 micrometers. For example, a first biasing layer closest to the substrate will have a thickness of about 0.5 micrometers, the electrode layer will have a thickness of about 0.1 micrometers and the second biasing layer furthest from the substrate will have a thickness of about 0.9 micrometers. Such a configuration will generally insure that the optical shutter has sufficient bias to limit the diameter of the shutter in the curled state.

FIG. 3, is a cross-sectional diagram of an optical display device 10 incorporating a supporting enclosure 40 and illumination source 42, in accordance with alternate embodiments of the present invention. The supporting enclosure is typically an opaque, box-like, structure that serves to support the optical display device and provides an environment for supplying radiant energy. The supporting enclosure may comprise any material suitable for housing the optical display, such as a polymer, metal or the like. The interior surfaces 44 of the supporting structure are typically dark colored surfaces formed of a light absorbing material. The illumination source may comprise any form of radiant energy, such as fluorescent, incandescent, or any other form of light. The enclosure should be sufficiently large enough to house the light source and provide the optical display with uniform light distribution.

In accordance with an embodiment of the present invention, a method for using the optical display device of the present invention in a transmissive mode is herein described. In a transmissive mode the illumination inside the supporting enclosure is turned on. The transmissive mode is most relevant in instances in which the external environment outside of the enclosure is relatively dark. The light travels past the open state shutter (as shown in FIG. 3) and through the pigmented translucent film 16. Thereby, illuminating the display in the color of light corresponding to the pigment of the film. In the closed state (as shown in FIG. 2) the light emanating from the illumination source would be blocked or reflected back into the enclosed area. In which case, the optical display device will appear as black. The duration the shutter is open and the degree, in terms of area, that the shutter is open can be made to depend on the applied voltage due to variations in the plan view area (i.e. shape) of the fixed electrodes. In this manner, the amount of color at each optical display can be controlled.

In accordance with another embodiment of the present invention, a method for using the optical display device of the present invention in a reflective mode is herein described. In a reflective mode the illumination inside the supporting enclosure is turned off. The reflective mode is most relevant in instances in which the external environment outside of the enclosure is relatively bright and well lighted. In the open shutter state, the external light strikes the top of the substrate construct, travels through the pigmented translucent film and into the enclosed area where it is absorbed by the interior surfaces of the enclosure. In this instance the optical display device will appear as black. In the closed shutter state, the external light strikes the top of the substrate construct, travels through the pigmented translucent film and is reflected by the optical shutter (typically the electrode element is opaque). The light reflects back through the substrate into the pigmented translucent film, thereby, illuminating the display with a color light corresponding to the pigment of the film.

FIG. 4 is a cross-sectional diagram of an optical display device 50 incorporating multiple optical shutters 20, a supporting enclosure 44 and one or more illumination sources 42, in accordance with an embodiment of the present invention. As depicted, three moveable optical shutters have been disposed on the underside of the substrate 12. The optical shutters have been disposed in lengthwise fashion, such that the end of the distal portion of one optical shutter generally coincides with the beginning of the fixed portion of the adjacent optical shutter.

As shown in FIG. 4, the optical display 50 incorporates a plurality of pigmented translucent films 16. As such, each optical shutter 20 has a corresponding pigmented translucent film region. Typically the plan view area of the optical shutter will generally be equivalent to the plan view area of the corresponding pigmented translucent film. In most array configurations the optical shutters will be grouped in threes, such that the optical shutters correspond to three primary color (red, green and blue) pigmented translucent films. Such a configuration of primary color pigmented translucent films allows for a complete spectrum of color generation. As depicted the plurality of pigmented translucent films may be disposed above the optically transparent substrate 12. However, as previously discussed, if the thickness of the substrate compared to the size of the shutters leads to parallax problems, then it is possible to position the pigmented translucent films on the same side of the substrate as the optical shutters. In this regard, the pigmented translucent films may reside between the substrate and the fixed electrode 14 or between the fixed electrode and the electrode elements 26 of the optical shutter.

The supporting enclosure of the optical display shown in FIG. 4 is similar in fashion to the supporting enclosure shown in FIG. 3. The enclosure is typically an opaque, box-like, structure that serves to support the optical display device and provides an environment for supplying radiant energy. The interior surfaces 44 of the supporting structure are typically dark colored surfaces formed of a light absorbing material.

As depicted in FIG. 4, the illumination source 42 may comprise a plurality of illumination sources with each source corresponding to an associated optical shutter. Alternatively, the illumination source may comprise a single illumination source that is capable of providing illumination for the entirety of the optical device. The illumination sources may comprise any form of radiant energy, such as fluorescent, incandescent, or any other feasible light source may be used.

Figure 5:
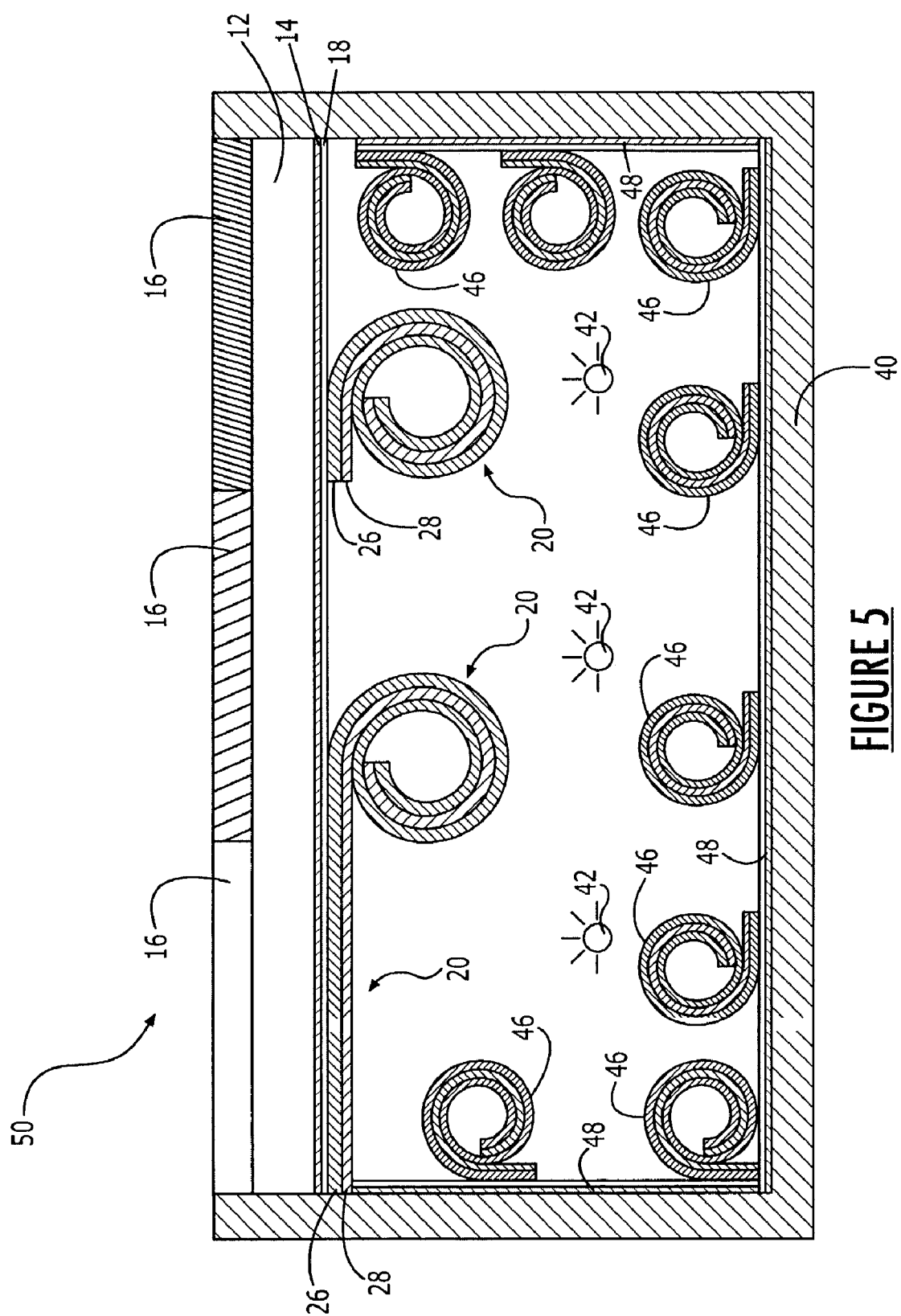
FIG. 5 is a cross-sectional view of an optical display device incorporating multiple optical shutters, associated pigmented translucent films and supplement optical shutters disposed on the interior walls of the supporting enclosure, in accordance with an embodiment of the present invention.

Additionally, as shown in FIG. 5, the interior surfaces of the supporting enclosure 40 may be lined with moveable films 46 and corresponding fixed electrodes 48. In an uncurled or closed state the moveable films would typically exhibit light absorbing characteristics. The light absorbing characteristics would typically be provided by an opaque or treated biasing element in the moveable films. In the closed state, the light absorbing surface would be exposed to the interior of the enclosure, insuring proper absorption of the external light (in a reflective mode with the primary optical shutters 20 in an open state). In a curled or open state, the fixed electrode 48, typically metal, and the electrode element of the moveable film, typically metal, would be exposed to reflect the internal illumination toward the substrate/pigmented translucent films (in a transmissive mode with the primary optical shutters in an open state).

It is also possible to configure the moveable films 46 such that they exhibit reflective characteristics in the uncurled or closed state. The reflective characteristics would typically be provided by a reflective (i.e., mirrored, white or bright) biasing element in the moveable film. In the closed state, the reflective surface would be exposed to the interior of the enclosure, insuring proper reflection of the external light (in a transmissive mode with the primary optical shutters 20 in an open state). In a curled or open state, the fixed electrode 48 would be opaque and exposure to light would result in proper light absorption of the external light (in a reflective mode with the primary optical shutters in an open state).

Figure 6:
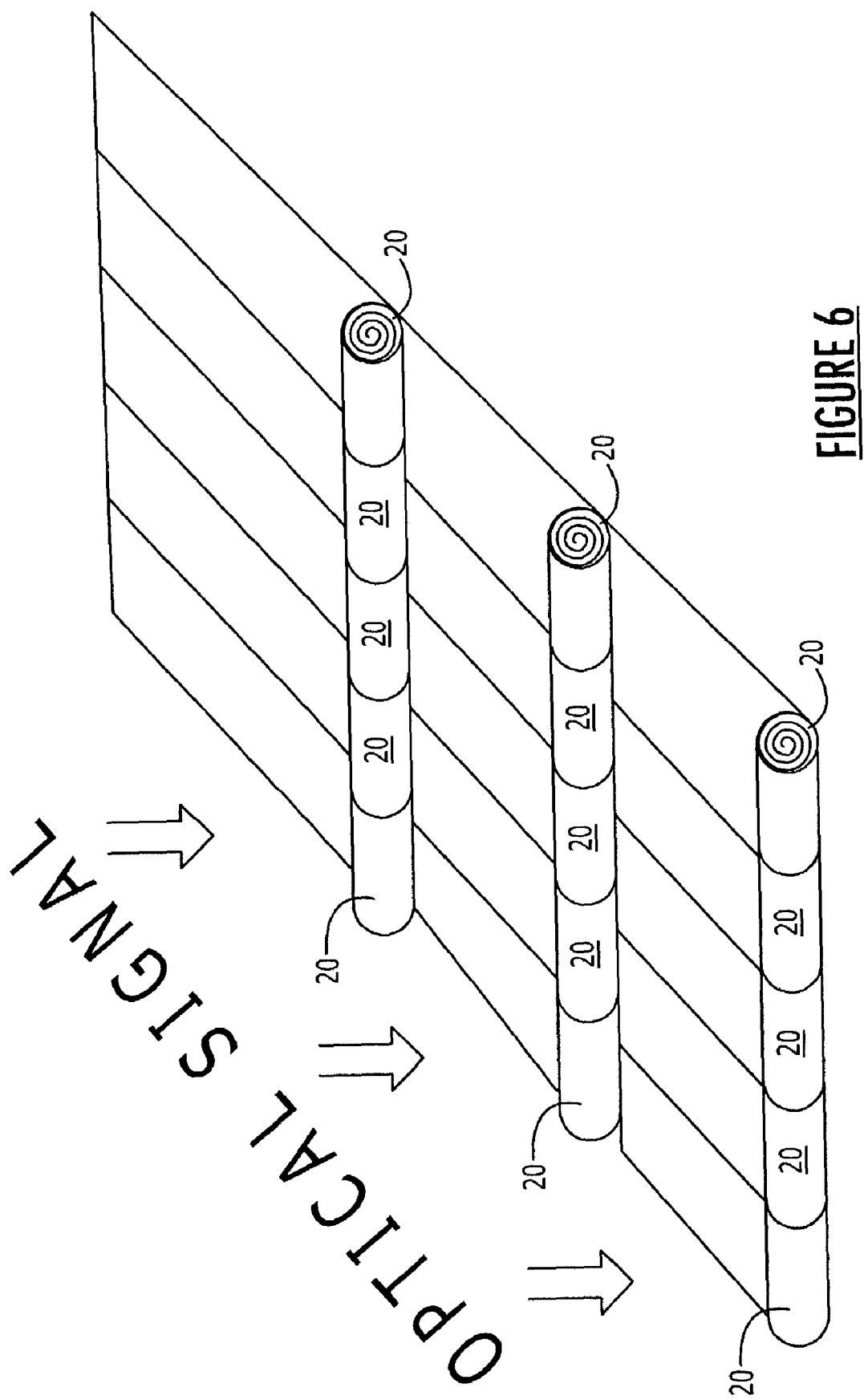
FIG. 6 is a perspective view of an optical display array incorporating multiple shutter, in accordance with an embodiment of the present invention.

The optical display device of FIG. 4 will typically be configured in an array whereby additional shutters are disposed within the supporting enclosure in side-by-side fashion, such that the fixed and distal portions of one optical shutter are generally side-by-side with fixed and distal portion of an adjacent optical shutter. Such an array formation is shown in the perspective view of FIG. 6. The arrays incorporates both lengthwise and side-by-side configurations of optical shutters 20 (i.e. rows and columns of optical shutters. In this configuration the optical shutters are said to be in conventional X-Y array formation and can be individually addressed using a standard X-Y addressing scheme to actuate the desired optical shutter(s). Other array configurations of optical shutters are also possible and are within the inventive concepts herein disclosed.

Additionally, the present invention provides for a method of fabricating an optical display device. FIGS. 7–10 illustrate various stages in the fabrication of the optical display device, in accordance with an embodiment of the present invention.

Figure 7:
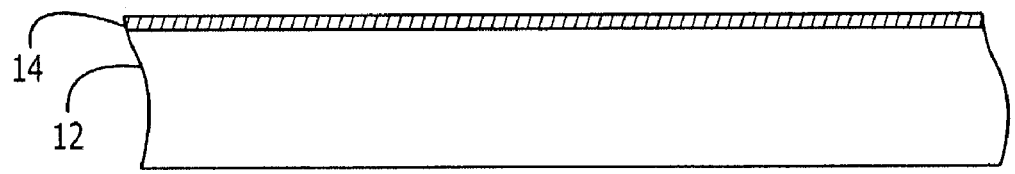
FIGS. 7–10 are cross-sectional views of an optical display device construct during various stages of fabrication, in accordance with a method for fabricating the present invention.

FIG. 7 is a cross-sectional view of a transparent substrate 12 having a fixed electrode 14 formed thereon. The substrate will typically comprise glass or another suitable transparent material. The fixed electrode will typically comprise Indium Tin Oxide (ITO) or another suitable transparent conductive material, such as a Group III Nitride (e.g. gallium nitride), or the like. The fixed electrode is typically deposited on the substrate using conventional photolithography techniques; patterning with a photoresist, followed by an etch process so that the resulting fixed electrode will generally align in plan view with the entirety of the electrode element in the optical shutter to insure the maximum possible closing force of the shutter.

Figure 8:
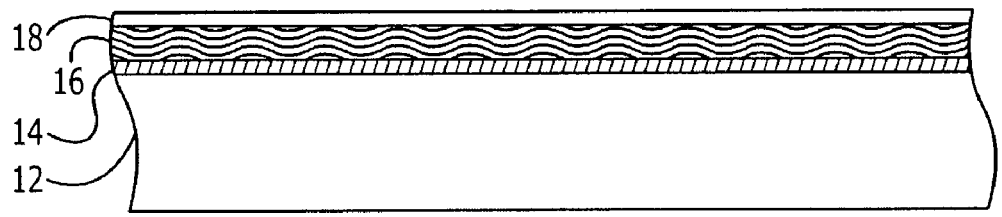

FIG. 8 is a cross-sectional view of the substrate construct having the pigmented translucent film 16 and dielectric element 18 formed thereon. The pigmented translucent film will typically be deposited by conventional sputtering or spin process techniques. As previously discussed the pigmented translucent film may be formed on the side of the substrate opposite the optical shutter or the side of the substrate that the optical shutter resides. In those embodiments in which the pigmented film is formed on the optical shutter side of the substrate, the pigmented film may be disposed between the fixed electrode and the substrate or between the fixed electrode and the electrode element of the optical shutter.

As shown in FIG. 8, the dielectric element is formed as a layer on the substrate construct. This is an alternate embodiment of the dielectric element. As previously discussed the dielectric element may be incorporated within the optical shutter, typically as an attribute of the biasing element or the dielectric element may comprise the air gap that exists between the fixed electrode and the electrode element of the optical shutter. In those embodiments in which the air gap suffices as the dielectric element, standoffs may be required to further isolate the fixed electrode from the moveable electrode. In the embodiment shown in FIG. 8, the dielectric element will be a transparent dielectric element comprised of plasma-enhanced chemical vapor deposition (PECVD) oxide, polyimide or the like. The dielectric element layer is deposited on the fixed electrode layer typically using a standard deposition technique, such as PECVD or the like.

Figure 9:
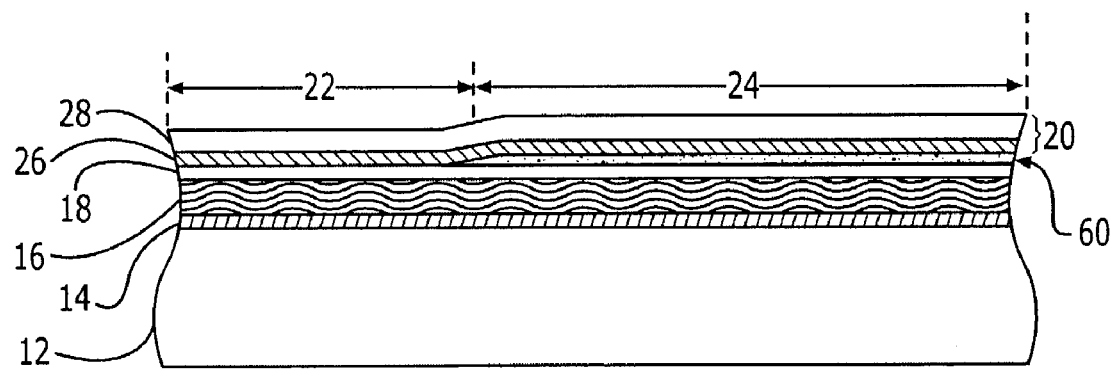

FIG. 9 illustrates a cross-sectional view of the optical display device having the optical shutter elements deposited on the substrate. A release layer 60 has been patterned and deposited on the dielectric element 18. The release layer, typically aluminum or another release material that will not adversely effect the transparent fixed electrode, will subsequently be removed to facilitate release of the distal portion 24 of the optical shutter 20. A shutter attachment region has been patterned into the release layer to allow for an attachment point for the fixed portion 22 of the optical shutter. A conventional deposition technique, such as evaporation, is typically used to deposit the release layer. the release layer will typically have a thickness of about 2000 angstroms.

Once the release layer is deposited the optical shutter is formed by depositing the electrode element 26, in the form of a layer, on the release layer 60 and the dielectric element layer 18. The electrode element layer is typically formed from gold or another suitable conductive material. The electrode element layer is deposited on the surface of release layer and the first biasing layer typically using conventional photolithography and etching techniques. The electrode element of the optical shutter will typically be patterned so as to be generally equivalent to the plan view configuration of the underlying fixed electrode. However, other patterns or plan view shapes of the electrode element that deviate from the underlying plan view shape of the fixed electrode are also possible. Once the electrode element is formed, the biasing element 28 is formed, typically in the form of a layer disposed on the electrode element. The biasing element will typically comprise a flexible polymeric material, such as polyimide, however, other suitable flexible polymers capable of withstanding the release layer etch process can also be employed. The biasing element layer is typically deposited using a standard deposition technique, such as a suitable spin-on process.

Figure 10:
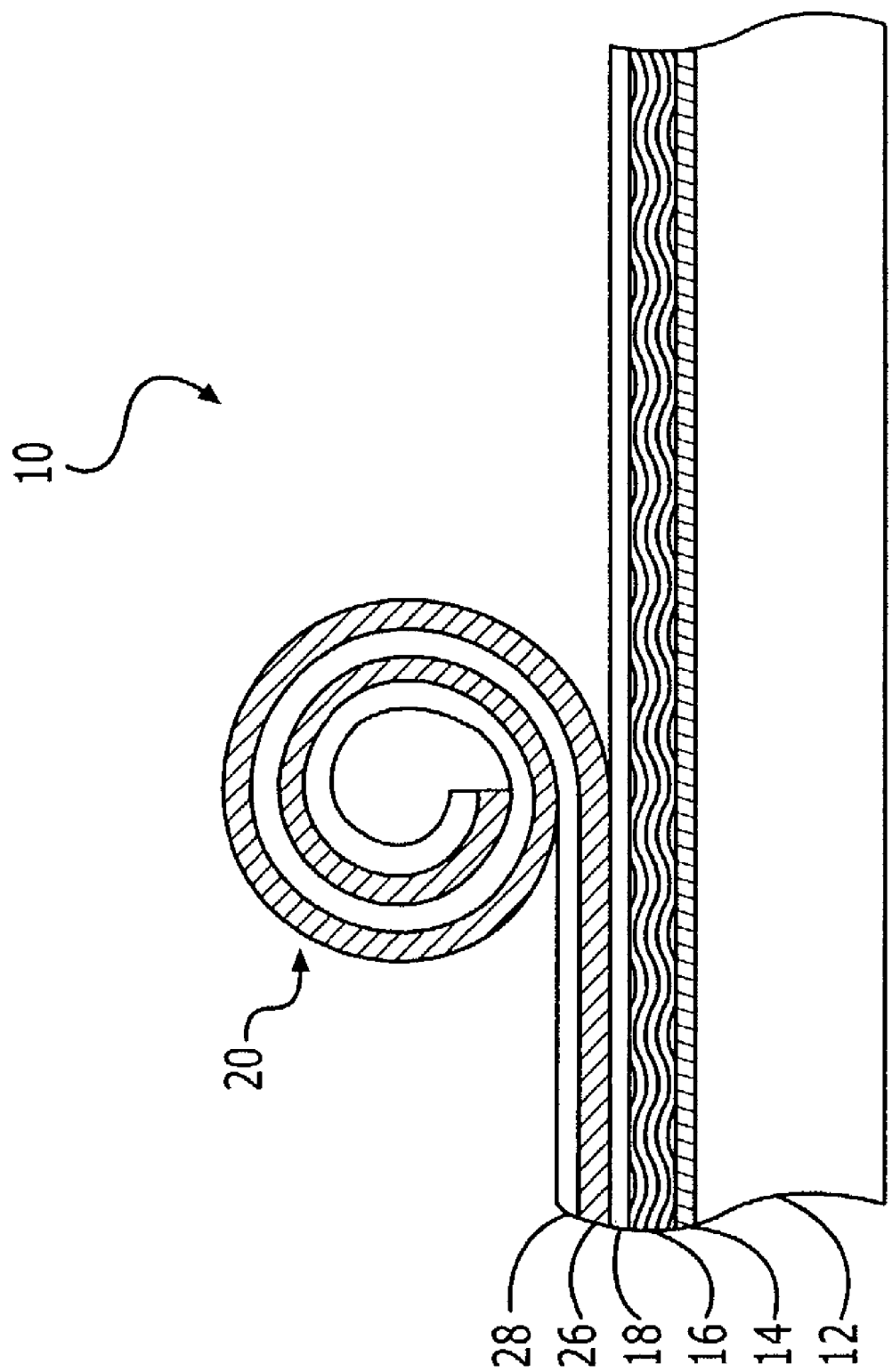

In FIG. 10, the apparatus is shown as a completed structure having undergone release layer removal. The release layer 60 (not shown in FIG. 10) is removed by exposing the apparatus to a suitable etchant/acid. The etchant/acid should be suitable to remove the chosen release layer material while not adversely effecting the surrounding electrode, biasing and/or dielectric element layer. Upon removal of the release layers the optical shutter 20 will separate from the underlying surface and generally curl in accordance to the intrinsic stress that is built-up in the structure.

The optical display device and associated arrays provided for in this invention teach the use of a simplified structure that can be used in both a reflective and transmissive mode of optical display. The simplified structure means that optical display devices can be constructed at relatively low cost and with minimal manufacturing complexity. The optical display devices of the present invention provide a wide angle of viewing and, since the optical path is void of polarizers, a more efficient use of the internal illumination source can be realized. By implementing the optical shutters of the present invention, the optical display device can be operated at lower power and with faster display speed than previous prior art optical display devices.

Many modifications and other embodiments of the invention will come to mind to one skilled in the art to which this invention pertains having the benefit of the teachings presented in the foregoing descriptions and the associated drawings. Therefore, it is to be understood that the invention That which is claimed:

1. An optical display device driven by electrostatic forces, said device having a viewing side from which the display is to be viewed, comprising:
   an optically transparent substrate and a movable opaque optical shutter arranged in that order with the substrate being disposed closest to said viewing side;
   an optically transparent fixed electrode disposed on the substrate;
   a pigmented translucent film disposed on the substrate facing toward the viewing side;
   said moveable opaque optical shutter opposite to the fixed electrode and the pigmented translucent film, the moveable shutter comprising an electrode element and a biasing element, wherein the moveable optical shutter includes a fixed portion attached to the substrate and a distal portion adjacent the fixed portion, the distal portion being moveable with respect to the fixed electrode; and
   a dielectric element disposed between the fixed electrode and the optical shutter electrode element,
   wherein a voltage differential established between the fixed electrode and the optical shutter electrode moves the optical shutter relative to the fixed electrode to thereby controllably regulate the amount of an optical signal propagating through the pigmented translucent film.

2. The optical display device according to claim 1, wherein the device is capable of providing reflective transmission of an optical signal and transmissive transmission of an optical signal.

3. The optical display device according to claim 1, wherein the optically transparent substrate further comprises glass.

4. The optical display device according to claim 1, wherein the optically transparent fixed electrode further comprises an indium tin oxide material.

5. The optical display device according to claim 1, wherein the optically transparent substrate further comprises opposing first and second planar surfaces and the pigmented translucent film is disposed on the first planar surface and the optically transparent fixed electrode is disposed on the second planar surface.

6. The optical display device according to claim 1, wherein the pigmented translucent film is disposed between the optically transparent substrate and the optically transparent fixed electrode.

7. The optical display device according to claim 1, wherein the optically transparent fixed electrode is disposed between the optically transparent substrate and the pigmented translucent film.

8. The optical display device according to claim 1, wherein the biasing element comprises at least one polymer film layer.

9. The optical display device according to claim 1, wherein the electrode element comprises an electrode layer and the biasing element comprises two polymer film layers deposited on opposite sides of the electrode layer.

10. The optical display device according to claim 1, wherein the electrode element and the biasing element have different thermal coefficients of expansion.

11. The optical display device according to claim 1, wherein the biasing element comprises at least two polymer films of different thickness.

12. The optical display device according to claim 10, wherein the at least two polymer films comprise a first polymer film of first thickness deposited on a surface of the electrode element nearest the substrate and a second polymer of second thickness deposited on a surface of the electrode element furthest from the substrate, the second thickness being greater than the first thickness.

13. The optical display device according to claim 1, wherein the biasing element comprises at least two polymer films of different coefficients of expansion.

14. The optical display device according to claim 1, further comprising a source of electrostatic energy electrically connected to at least one of the substrate electrode and the electrode element.

15. The optical display device according to claim 1, further comprising a supporting enclosure that supports the optical display device by elevating the optically transparent substrate.

16. The optical display device according to claim 15, further comprising an illumination source provided for within the supporting enclosure.

17. The optical display device according to claim 15, wherein the supporting enclosure further comprises light absorbing interior surfaces.

18. The optical display device according to claim 14, wherein the supporting enclosure further comprises interior surfaces having at least one interior surface electrode disposed on an interior surface and at least one moveable film generally overlying the interior surface electrode, the at least one moveable film comprising an electrode element and a biasing element, wherein the at least one moveable film includes a fixed portion attached to an interior surface and a distal portion adjacent to the fixed portion, the distal portion being moveable with respect to the interior surface electrode.

19. The optical display device according to claim 18, wherein the at least one movable film generally unrolls to close when a voltage differential is established between the interior surface electrode and the electrode element in the moveable film to provide light-absorbing and reflective capabilities to an enclosed area of the support enclosure.

20. An optical display array driven by electrostatic forces, said display array having a viewing side from which the display array is to be viewed, comprising:
   an optically transparent substrate and a plurality movable opaque optical shutters arranged in that order with the substrate being disposed closest to said viewing side;
   an optically transparent fixed electrode disposed on the substrate;
   a plurality of pigmented translucent films disposed on the substrate on a side of the substrate toward the viewing side;
   said plurality of moveable opaque optical shutters opposite to the fixed electrode and the pigmented translucent films, the moveable shutters comprising an electrode element and a biasing element, wherein the moveable optical shutters include a fixed portion attached to the substrate and a distal portion adjacent the fixed portion, the distal portion being moveable with respect to the fixed electrode; and
   a dielectric element disposed between the fixed electrode and the optical shutter electrode elements,
   wherein a voltage differential established between the fixed electrode and the electrode element of at least one of the plurality of moveable optical shutters moves the optical shutter relative to the fixed electrode to thereby controllably regulate the amount of an optical signal propagating through the pigmented translucent film.

21. The optical display array according to claim 20, wherein the array is capable of providing reflective transmission of an optical signal and transmissive transmission of an optical signal.

22. The optical display array according to claim 20, wherein the plurality of optical shutters are configured in an array pattern such that a non-attached end of the distal portion of a first optical shutter is generally adjacent to the fixed portion of a second optical shutter when the first optical shutter is electrostatically activated.

23. The optical display array according to claim 20, wherein the plurality of optical shutters are configured in a pattern such that the fixed portion and the distal portion of a first optical shutter are generally adjacent to the fixed portion and the distal portion of a second optical shutter.

24. The optical display array according to claim 20, wherein the plurality of optical shutters are configured in a column and row array pattern.

25. The optical display array according to claim 20, wherein the optically transparent fixed electrode further comprises an indium tin oxide material.

26. The optical display array according to claim 20, wherein the optically transparent substrate further comprises opposing first and second planar surfaces and the plurality of pigmented translucent films are disposed on the first planar surface and the optically transparent fixed electrode is disposed on the second planar surface.

27. The optical display array according to claim 20, wherein the plurality of pigmented translucent films are disposed between the optically transparent substrate and the optically transparent fixed electrode.

28. The optical display array according to claim 20, wherein the optically transparent fixed electrode is disposed between the optically transparent substrate and the plurality of pigmented translucent films.

29. The optical display array according to claim 20, further comprising a source of electrostatic energy electrically connected to at least one of the substrate electrode and the plurality of optical shutter electrode elements.

30. The optical display array according to claim 20, further comprising a supporting enclosure that supports the optical display array.

31. The optical display array according to claim 30, further comprising an illumination source provided for within the supporting enclosure.

32. The optical display array according to claim 30, wherein the supporting device further comprises light absorbing interior surfaces.

33. The optical display array according to claim 30, wherein the supporting device further comprises interior surfaces having at least one interior surface electrode disposed on an interior surface and at least one moveable film generally aligned with the interior surface electrode, the moveable film comprising an electrode element and a biasing element, wherein the moveable film includes a fixed portion attached to an interior surface and a distal portion adjacent to the fixed portion, the distal portion being moveable with respect to the interior surface electrode.

34. The optical display array according to claim 33, wherein the at least one moveable film generally unrolls to lie generally parallel to the interior surface when a voltage differential is established between the interior surface electrode and the electrode element of the moveable opaque film to provide light-absorbing and reflective capabilities to an enclosed area of the support enclosure.

35. A method for reflective mode and transmissive mode optical display of an optical signal, the method comprising the steps of:

providing for an optical display device having a viewing side for the optical display from which the display is to be viewed, an optically transparent substrate and a movable opaque optical shutter arranged in that order with the substrate being disposed closest to said viewing side, an optically transparent fixed electrode disposed on the substrate; a pigmented translucent film disposed on the substrate on a side of the substrate toward the viewing side, said moveable opaque optical shutter comprising an electrode element and a biasing element, the moveable opaque optical shutter having a fixed portion attached to the substrate and a distal portion unattached to the substrate that is biased in a curled state absent an electrostatic force, and a dielectric element disposed between the fixed electrode and the optical shutter electrode element;

transmitting a first optical signal from a first optical source disposed adjacent to the optical shutter, the first optical signal propagating through the optically transparent substrate, the optically transparent fixed electrode and the pigmented translucent film;

providing a voltage differential between the fixed electrode and the electrode element to create an electrostatic force that moves the optical shutter to a position relative to the fixed electrode to thereby controllably regulate the amount of the first optical signal propagating through the pigmented translucent film; and transmitting a second optical signal from a second optical source disposed adjacent to a surface of the substrate that is opposite the first optical source, the second optical signal propagating through the pigmented translucent film, the optically transparent fixed electrode and the transparent substrate, reflecting the second optical signal off of the optical shutter and propagating the second optical signal back through the optically transparent substrate, the optically transparent fixed electrode and the pigmented translucent film.

36. An optical display device driven by electrostatic forces, said device having a viewing side from which the display is to be viewed, comprising:

an optically transparent substrate, a movable opaque optical shutter and an illumination source arranged in that order with the substrate being disposed closest to said viewing side;

an optically transparent fixed electrode disposed on the substrate;

a pigmented translucent film disposed on the substrate facing toward the viewing side;

said moveable opaque optical shutter opposite to the fixed electrode and the pigmented translucent film, the moveable shutter comprising an electrode element and a biasing element, wherein the moveable optical shutter includes a fixed portion attached to the substrate and a distal portion adjacent the fixed portion, the distal portion being moveable with respect to the fixed electrode; and a dielectric element disposed between the fixed electrode and the optical shutter electrode element, wherein a voltage differential established between the fixed electrode and the optical shutter electrode moves the optical shutter relative to the fixed electrode to thereby controllably regulate the amount of the optical signal produced by the illumination source and propagating through the pigmented translucent film.

* * * * *